Sept. 21, 1926.  1,600,892
A. M. KROCZEK
BIRDCAGE GUARD
Filed August 5, 1924

A. M. Kroczek
INVENTOR
BY Victor J. Evans
ATTORNEY

Patented Sept. 21, 1926.

1,600,892

UNITED STATES PATENT OFFICE.

ANTON M. KROCZEK, OF CHICAGO, ILLINOIS.

BIRDCAGE GUARD.

Application filed August 5, 1924. Serial No. 730,253.

This invention relates to a bird cage construction and more particularly to a guard therefor and has for its primary object the construction of a transparent flexible guard which will be readily arranged in place and when once in place will be difficult to get out of position.

An object of the invention is the novel manner of forming the guard and associating same with the various portions of the bird cage so that the guard will be effectively held in place and the edge portions thereof concealed.

Besides the above my invention is distinguished in the use of a guard of transparent material so that the bird can be readily viewed while at the same time preventing any material from making its exit from the cage.

With these and other objects in view the invention will be better understood from the following detailed description taken in connection with the accompanying drawings wherein.

Figure 1:
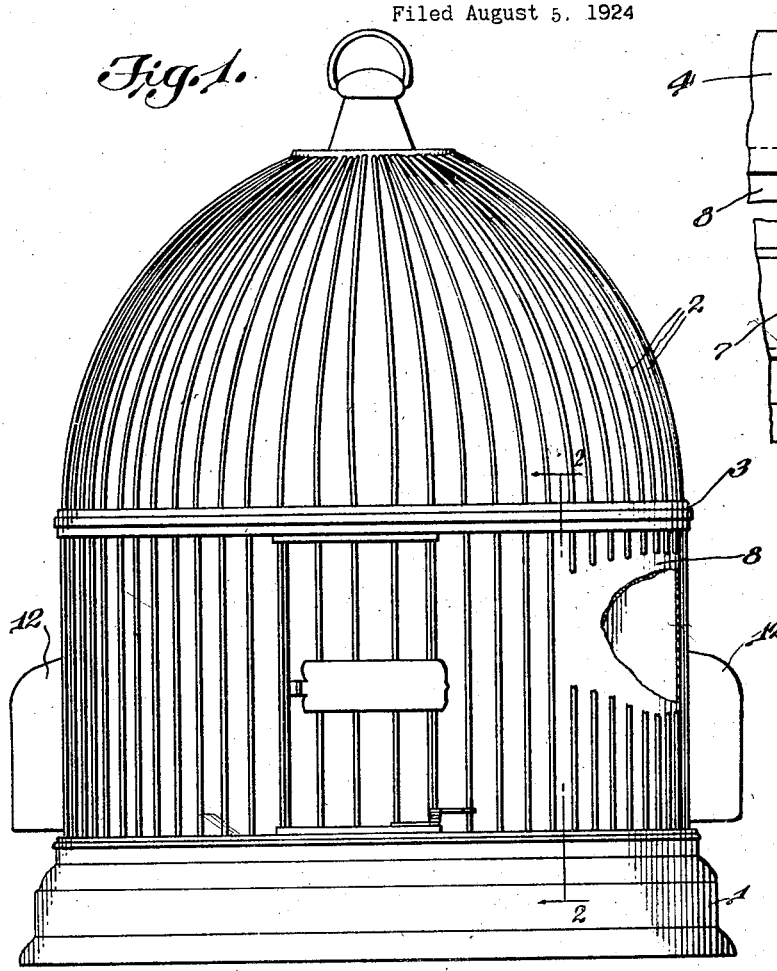
Fig. 1 is a side elevation of a bird cage partly in section illustrating my invention.
Figure 2:
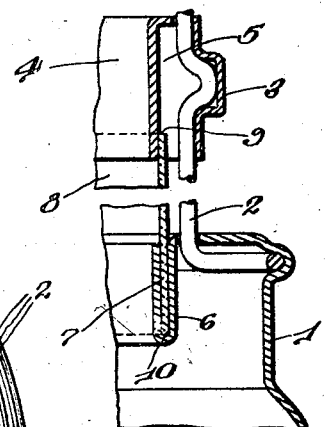
Fig. 2 is an enlarged sectional view on the line 2—2 of Fig. 1.
Figure 3:
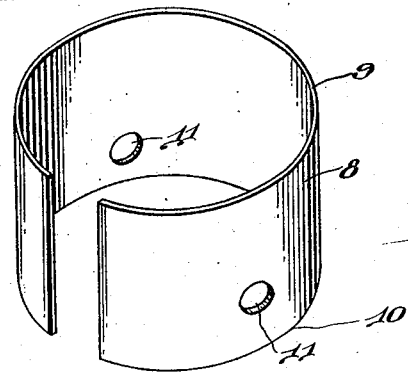
Fig. 3 is a perspective view of the guard.
Figure 4:
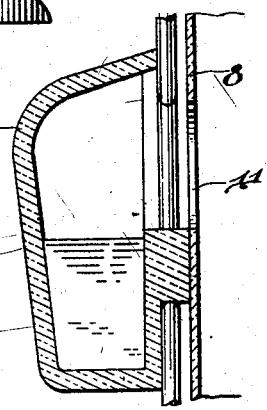
Fig. 4 is a detailed enlarged sectional view through one of the receptacles.

Again referring to the drawing illustrating one of the many constructions of my invention the numeral 1 designates a base or base ring of the bird cage upwardly from which rises the wire strands 2 which are connected in a manner more clearly set forth in my copending application for patent filed August 1, 1924, Serial No. 729,585.

The band 3 in this particular instance has a spaced depending flange 4 for forming the annular recess 5. The base ring is provided with a U shaped annular flange 6 forming a recess 7. My improved guard 8 is of band shaped formation constructed from a flexible transparent material such as celluloid. This guard has its upper marginal edge 9 seated behind the flange 4 and its lower marginal edge 10 seated in the recess of the flange 6 and thus it will be seen that the band may be readily arranged in place and effectively held in position with the edge portions concealed. To complete my invention, openings 11 are formed in the band to register with the openings in the receptacle 12.

From the foregoing description taken in connection with the accompanying drawing it will be apparent that I provide a guard completely transparent and of the proper rigidity to retain its shape after being clamped in place by the band and ring.

It is, of course, to be understood that the band may be constructed from other materials and clamped in position in other manners, therefore, I do not desire to be limited in any manner except as set forth in the claims hereunto appended.

Having thus described my invention what I claim is:

1. In combination with a bird cage having a band provided with a portion arranged within the bird cage, a base ring, a transparent guard having its upper edge engaging said portion of the band and its lower edge engaged by the base ring within the bird cage.

2. In combination a bird cage having a band provided with a depending flange, a base ring provided with U shaped flange and a band shaped guard having its upper edge portion engaging behind said band flange and its lower marginal edge portion seated in said U shaped flange.

In testimony whereof I affix my signature.

ANTON M. KROCZEK.